Patented Apr. 3, 1945

2,373,049

UNITED STATES PATENT OFFICE 2,373,049

STABILIZATION OF ORGANIC SUBSTANCES

Charles J. Pedersen, Penns Grove, N. J., assignor to E. I. du Pont de Nemours & Company, Wilmington, Del., a corporation of Delaware No Drawing. Application February 5, 1943, Serial No. 474,847

20 Claims. (Cl. 44—74)

This invention relates to the stabilization of organic substances and particularly to the stabilization of such substances which are subject to deterioration caused by the action of molecular oxygen and catalyzed by metals and their compounds.

Many organic products, such as drying oils, rubber, petroleum products, photographic developers and synthetic unsaturated compounds, are readily attacked by oxygen and the resulting deterioration imparts undesirable qualities to them and eventually destroys their usefulness.

Signal success has been achieved in recent years, in the preservation of many organic substances, by the discovery and use of compounds generically called "oxidation inhibitors" or "antioxidants." These agents, mostly oxidizable organic compounds, retard the auto-catalytic process. Since antioxidants are themselves oxidized in the course of time, as a result of auto-oxidation, the beneficial effect, obtained by their use, is not permanent and they protect the organic substances only so long as they are not rendered inactive. They are, moreover, very specific in action, each group of auto-oxidizable substances requiring a different type of antioxidant for the best results.

Vanadium, chromium, manganese, iron, cobalt, copper and their catalyticaly active compounds accelerate the rate of oxidation of many organic substances. For example, it is well known that copper compounds speed the formation of gum in cracked gasoline and the aging of rubber and that cobalt compounds promote the oxidation of drying oils. They also accelerate the oxidation of aromatic hydroxy and amino antioxidants, used to stabilize these oxidizable substances. Hence, these metal catalysts and the antioxidants are antagonistic in action, and the normal inhibiting effect of the latter is greatly reduced in the presence of the former.

Metal compounds occur naturally in many organic products, but often in such slight traces as to cause very little harm. Their concentrations, however, are frequently raised during the course of handling and utilizing the products; vessels and conduits, made of metals containing copper, etc., are used for storage and transportation, or ingredients, contaminated with metal compounds, might be added.

The harm done by these extraneous catalysts may be prevented by at least three methods: (1) their removal by purification, but often this is practicaly impossible of accomplishment and usually too costly to be economically feasible, (2) the addition of a sufficient amount of an antioxidant so that its preserving effect is equal to or greater than the pro-oxidant effects of the metal catalysts present, but the effectiveness of the antioxidant is so greatly diminished by the metal catalysts that the advantage gained under this circumstance is seldom worth the cost of the increased quantity of antioxidant required for adequate stabilization, and (3) the suppression of the catalytic activity of the metal compounds by chemical means without physically removing them from the system.

It is an object of the present invention to retard the deterioration of organic substances caused by the action of molecular oxygen and promoted by the presence of certain metal catalysts and their catalytically active compounds. Another object is to render antioxidants, which are relatively ineffective in the presence of metal catalysts and their catalytically active compounds, effective to inhibit the oxidation of oxidizable organic substances even in the presence of metal catalysts and their catalytically active compounds. A further object is to provide a new class of metal deactivators which are effective to render metal catalysts inactive to catalyze the oxidation of oxidizable organic substances containing or in contact with such metal catalysts. A more particular object is to inhibit the deterioration of petroleum hydrocarbons in the presence of metal catalysts and their catalytically active compounds. Other objects are to provide new compositions of matter and to advance the art. Still other objects will appear hereinafter.

The above and other objects may be accomplished in accordance with my invention which comprises adding to organic substances, normally subject to deterioration caused by the action of molecular oxygen, and containing a catalyst of the group of vanadium, manganese, cobalt, copper and their compounds, normally effective to catalyze oxidation of said organic substances, metal deactivators in a small proportion sufficient to deactivate such catalysts, such metal deactivators being thioureas having the formula

wherein R represents hydrogen or an electronegative organic radical and salts of such thioureas. The organic substance also may and generally will contain an antioxidant which is normally effective to retard oxidation of the organic substance in the absence of the metal catalyst. I have found that such metal deactivators are capable of effectively suppressing the catalytic activity of vanadium, manganese, cobalt, copper and their catalytically active compounds and hence will render such catalysts ineffective to catalyze the oxidation of the organic substance, including any antioxidant which may be present.

The organic substances, which may be treated in accordance with my invention, include fruit and vegetable juices, textile fibres, photographic developers, antioxidants, synthetic unsaturated compounds, petroleum hydrocarbons, rubber and the like. My metal deactivators are particularly desirable in liquid petroleum hydrocarbons and especially in gum-forming hydrocarbon distillates, such as, for example, cracked gasoline. Generally, in practice, the organic substance, particularly the petroleum hydrocarbons, will also contain an antioxidant which is normally effective to materially retard the deterioration or oxidation of the organic substance in the absence of the catalytically active metals, but which is less effective in the presence of such metals.

The metal deactivators of my invention must contain as a nucleus the group

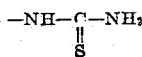

wherein the free valence is satisfied by hydrogen or an electronegative organic radical and may be used as the free compounds or as their salts. Where the thioureas are acidic, I may use their salts of bases, such as the salts of the alkali metals, ammonia or organic substituted ammonium bases. When the thioureas are alkaline in reaction, I may use their salts of acids including inorganic acids, as well as organic acids. Generally, I prefer the free thioureas.

Representative electronegative organic radicals are aromatic, vinyl, allyl and guanyl. Substituted thiourea, in which the substituent is electropositive, such as amino and alkyl radicals, is excluded from within the scope of my invention. Preferably, the electronegative organic radical, in the substituted thiourea, is an aromatic radical and particularly an aryl radical. By an "aromatic radical," I mean one in which the free valence belongs to a carbon atom of a benzene ring, and which may contain non-hydrocarbon substituents. By an "aryl radical," I mean an aromatic radical which consists of the elements carbon and hydrogen. Also, preferably, the aromatic and aryl radicals, in the substituted thioureas, are of the benzene series, that is, contain only one benzene ring. The most desirable compounds appear to be thiourea and N-phenylthiourea.

Definite operative concentrations of the metal deactivator in the organic substance cannot be specified for each case as the quantity required is dependent upon the amount of metal catalyst present in the organic substance. The metal deactivator should be present in the proportion of approximately 5 to 10 times the amount of the metal catalyst present, on the basis of the metallic element, in order to obtain complete deactivation of the metal catalyst. Higher proportions of metal deactivator may be employed, particularly when a reservoir of metal is present in the form of metal in bulk in contact with the organic substance. Generally, from about 0.001% to about 0.1%, based on the weight of the organic substance, will be sufficient for most purposes, particularly when the organic substance is a liquid petroleum hydrocarbon, such as a gum-forming hydrocarbon distillate of the character of cracked gasoline. In rubber, about 0.1% to about 1.0% will generally be employed.

The catalytically active metal and its compounds may be dissolved in the organic substance or suspended therein or may be in the form of metal in bulk in intimate contact with the organic substance. It will be understood that, when I refer to an organic substance containing a catalyst, I mean to include those cases wherein the metal in bulk form is in contact with the organic substance as well as those cases wherein the catalytically active metal is dissolved or suspended in the organic substance.

The deactivators may be added to the oxidizable organic substances to be protected in any form and manner. They may be in solid or liquid form, mixed with other additional agents or dissolved in a solvent. They may be dissolved in the organic substance or dispersed therein in any suitable manner. They may be added to the finished organic substance or to the organic substance at any suitable stage in its manufacture.

The experimental results, obtained with compounds belonging to this class of deactivators, are given in the following tables.

In order to avoid confusion arising from a superabundance of data, gasoline has been selected as an example of an auto-oxidizable organic substance for the purposes of illustration. The samples of gasoline, used in the following tests, were either cracked gasolines or blends of cracked and straight-run gasolines, completely refined, but otherwise untreated with chemical agents, such as dyes, anti-knocks and antioxidants. Since gasoline is a mixture of variable composition, identical results are not obtained with different samples. The magnitude of the effects is great enough, however, to render this difference relatively insignificant.

p-(n-Butyl) aminophenol, abbreviated BuBAP, has been chosen as a representative gasoline antioxidant. The metals, present as catalysts, were employed as their oleates. The concentrations of the antioxidants and the metal deactivators are given in weight percent in gasoline. The concentrations of the metals are given in parts per million by weight of the metal, abbreviated P. P. M., rather than by weight of the metal compound.

The term "stabilized gasoline" is employed to denote gasoline to which has been added an antioxidant in sufficient quantity to significantly increase its induction period in the absence of added metal catalysts.

The accelerated method, used for determining the induction periods given below, was the one described in J. I. E. C. 25, 397 (1933). It consists in heating 100 cc. of gasoline at 100° C. in a 1 liter Pyrex flask containing pure oxygen. The internal pressure is observed every 10 minutes by means of a manometer attached to the system. The elapsed time, from the start of the test until the gasoline begins to absorb oxygen at the rate of 10 cc. per 10 minutes or higher, as shown by the fall in internal pressure, is taken as the induction period. It has been found that the induction period, obtained by this method, although greatly shortened, is a fairly accurate measure of the relative stability of gasoline under normal storage conditions.

Table I

| No. | Conc. BuPAP | Conc. Cu | Deactivator | Conc. | Ind. period |
|---|---|---|---|---|---|
|   | Wt. per cent | P.P.M. |   | Wt. per cent | Minutes |
| 1 | 0.0 | 0.0 | None |   | 130 |
| 2 | 0.0025 | 0.0 | ___do___ |   | 395 |
| 3 | 0.0025 | 1.0 | ___do___ |   | 75 |
| 4 | 0.0025 | 1.0 | N-guanylthiourea anthranilate. | 0.005 | 390 |
| 5 | 0.0025 | 1.0 | N-guanylthiourea naphthenate. | 0.005 | 330 |
| 6 | 0.0025 | 1.0 | N-guanylthiourea carbonate. | 0.005 | 330 |
| 7 | 0.0025 | 1.0 | N-(p-hydroxyphenyl) thiourea. | 0.002 | 225 |
| 8 | 0.0025 | 1.0 | N-allylthiourea | 0.005 | 175 |
| 9 | 0.0025 | 1.0 | N-butylthiourea | 0.005 | 90 |

It will be observed that the catalytic action of copper is counteracted to a greater or lesser extent by the different derivatives of thiourea containing an electronegative radical. The alkyl-substituted compound is practically without effect, the alkyl radical being electropositive.

The effect of another deactivator is shown in Table II.

Table II

| No. | Conc. BuPAP | Conc. Cu | Deactivator | Conc. | Ind. period |
|---|---|---|---|---|---|
|   | Wt. per cent | P.P.M. |   | Wt. per cent | Minutes |
| 1 | 0.0 | 0.0 | None |   | 130 |
| 2 | 0.002 | 0.0 | ___do___ |   | 485 |
| 3 | 0.002 | 1.0 | ___do___ |   | 50 |
| 4 | 0.002 | 1.0 | N-(3-aminophenyl)-thiourea. | 0.0025 | 490 |

The relationship between the concentration of thiourea and the induction period is shown in Table III.

Table III

| No. | Conc. BuPAP | Conc. Cu | Conc. Thiourea | Induction period |
|---|---|---|---|---|
|   | Wt. per cent | P.P.M. | Wt. per cent | Minutes |
| 1 | 0.0 | 0.0 | 0.0 | 130 |
| 2 | 0.002 | 0.0 | 0.0 | 415 |
| 3 | 0.002 | 1.0 | 0.0 | 40 |
| 4 | 0.002 | 1.0 | 0.001 | 305 |
| 5 | 0.002 | 1.0 | 0.002 | 325 |
| 6 | 0.002 | 1.0 | 0.005 | 370 |
| 7 | 0.002 | 1.0 | 0.01 | 405 |

It will be noted that very little advantage is gained by adding more than the quantity of deactivator required for complete deactivation. The concentration curves, obtained with these compounds, instead of being rectilinear as for antioxidants, are logistic and the effects of antioxidants and deactivators are synergistic.

It will be understood that the experiments and tests, hereinbefore given, have been given for illustrative purposes only. Many variations and modifications can be made in my invention without departing from the spirit or scope thereof. The metal deactivators of my invention can be employed in other organic substances, the metals may be present in other forms and other compounds, within the broad scope of my invention, may be substituted for the compounds specifically referred to hereinbefore. While I have disclosed the use of single metal deactivators, it will be apparent that mixtures of two or more metal deactivators of my invention may be employed if desired.

Besides many others, the following compounds are within the scope of my invention:

N-phenylthiourea
N-(o-tolyl) thiourea
N-(p-tolyl) thiourea
N-(1-naphthyl) thiourea
N-(2-naphthyl) thiourea
N-(4-ethoxyphenyl) thiourea
N-(2-methoxyphenyl) thiourea
N-xylylthiourea
N-(o-cymyl) thiourea
N-(m-tolyl) thiourea
N-(o-biphenyl) thiourea
N-(p-biphenyl) thiourea It will be apparent that, by my invention, I am able to effect the stabilization of organic substances susceptible to the harmful action of molecular oxygen catalyzed by vanadium, manganese, cobalt, copper and their catalytically active compounds. This stabilization may be accomplished, in accordance with my invention, by the addition of metal deactivators, either alone or in combination with an amount of an antioxidant sufficient to stabilize the substance in the absence of metal catalysts. It is often technically and economically unfeasible to counteract the catalytic effects of such metals by means of an antioxidant alone. I believe that the metal deactivators of my invention function by forming very stable complexes with the metals, which complexes are catalytically inactive. It appears that the metal deactivators of my invention, in general, are not antioxidants. However, my invention is not to be limited by any theory as to the manner in which the metal deactivators function to produce the results.

I claim:

1. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and having incorporated therein a metal deactivator in a small proportion sufficient to deactivate said catalyst, said metal deactivator being a member of the group consisting of thioureas having the formula

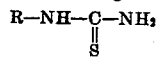

wherein R represents a member of the group consisting of hydrogen and an electronegative organic radical and salts of such thioureas.

2. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and having incorporated therein a metal deactivator in a small proportion sufficient to deactivate said catalyst, said metal deactivator being a thiourea having the formula

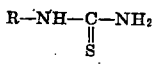

wherein R represents a member of the group consisting of hydrogen and an electronegative organic radical.

3. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and having incorporated therein a metal deactivator in a small proportion sufficient to deactivate said catalyst, said metal deactivator being thiourea.

4. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and having incorporated therein a metal deactivator in a small proportion sufficient to deactivate said catalyst, said metal deactivator being thiourea in which a single hydrogen has been replaced by an electronegative organic radical.

5. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and having incorporated therein a metal deactivator in a small proportion sufficient to deactivate said catalyst, said metal deactivator being thiourea in which a single hydrogen has been replaced by an electronegative aromatic radical.

6. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and having incorporated therein a metal deactivator in a small proportion sufficient to deactivate said catalyst, said metal deactivator being thiourea in which a single hydrogen has been replaced by an aryl radical.

7. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and having incorporated therein a metal deactivator in a small proportion sufficient to deactivate said catalyst, said metal deactivator being thiourea in which a single hydrogen has been replaced by an electronegative aromatic radical of the benzene series.

8. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and having incorporated therein a metal deactivator in a small proportion sufficient to deactivate said catalyst, said metal deactivator being thiourea in which a single hydrogen has been replaced by an aryl radical of the benzene series.

9. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and having incorporated therein a metal deactivator in a small proportion sufficient to deactivate said catalyst, said metal deactivator being N-phenylthiourea.

10. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being a member of the group consisting of thioureas having the formula

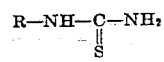

wherein R represents a member of the group consisting of hydrogen and an electronegative organic radical and salts of such thioureas.

11. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being thiourea.

12. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being thiourea in which a single hydrogen has been replaced by an electronegative organic radical.

13. A composition comprising an organic substance, normally subject to deterioration caused by the action of molecular oxygen, containing a catalyst of the group consisting of vanadium, manganese, cobalt, copper and their compounds normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being thiourea in which a single hydrogen has been replaced by an electronegative aromatic radical.

14. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being thiourea in which a single hydrogen has been replaced by an electronegative aromatic radical of the benzene series.

15. A composition comprising an organic substance, normally subject to deterioration caused by the action of molecular oxygen, containing a catalyst of the group consisting of vanadium, manganese, cobalt, copper and their compounds, normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being N-phenylthiourea.

16. A composition comprising petroleum hydrocarbons, normally subject to deterioration caused by the action of molecular oxygen, containing a catalyst of the group consisting of vanadium, manganese, cobalt, copper and their compounds, normally effective to catalyze oxidation of said petroleum hydrocarbons, and having incorporated therein a metal deactivator in a small proportion sufficient to deactivate said catalyst, said metal deactivator being a member of the group consisting of thioureas having the formula

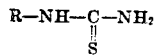

wherein R represents a member of the group consisting of hydrogen and an electronegative organic radical and salts of such thioureas.

17. A composition comprising petroleum hydrocarbons, normally subject to deterioration caused by the action of molecular oxygen, containing a catalyst of the group consisting of vanadium, manganese, cobalt, copper and their compounds, normally effective to catalyze oxidation of said petroleum hydrocarbons, and having incorporated therein a metal deactivator in a small proportion sufficient to deactivate said catalyst, said metal deactivator being thiourea.

18. A composition comprising petroleum hydrocarbons, normally subject to deterioration caused by the action of molecular oxygen, containing a catalyst of the group consisting of vanadium, manganese, cobalt, copper and their compounds, normally effective to catalyze oxidation of said petroleum hydrocarbons, and having incorporated therein a metal deactivator in a small proportion sufficient to deactivate said catalyst, said metal deactivator being N-phenylthiourea.

19. A composition comprising petroleum hydrocarbons, normally subject to deterioration caused by the action of molecular oxygen, containing a catalyst of the group consisting of vanadium, manganese, cobalt, copper and their compounds, normally effective to catalize oxidation of said petroleum hydrocarbons, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being a member of the group consisting of thioureas having the formula

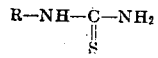

wherein R represents a member of the group consisting of hydrogen and an electronegative organic radical and salts of such thioureas.

20. A composition comprising gasoline, normally subject to deterioration caused by the action of molecular oxygen, containing a catalyst of the group consisting of vanadium, manganese, cobalt, copper and their compounds, normally effective to catalyze oxidation of said gasoline, and having incorporated therein a metal deactivator in a small proportion sufficient to deacitvate said catalyst, said metal deactivator being a member of the group consisting of thioureas having the formula

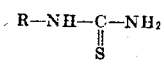

wherein R represents a member of the group consisting of hydrogen and an electronegative organic radical and salts of such thioureas.

CHARLES J. PEDERSEN.